(12) United States Patent
Tan et al.

(10) Patent No.: US 11,123,840 B2
(45) Date of Patent: Sep. 21, 2021

(54) FINISHING A SURFACE OF A COMPONENT MADE BY ADDITIVE MANUFACTURING

(71) Applicant: ROLLS-ROYCE plc, London (GB)

(72) Inventors: Kai Liang Tan, Derby (GB); Moiz S Vohra, Derby (GB); Wei Lun Tan, Derby (GB); Arun Prasanth Nagalingam, Derby (GB); Swee Hock Yeo, Derby (GB); Arthur Wee, Derby (GB)

(73) Assignee: ROLLS-ROYCE plc, London (GB)

( * ) Notice: Subject to any disclaimer, the term of this patent is extended or adjusted under 35 U.S.C. 154(b) by 69 days.

(21) Appl. No.: 16/690,295

(22) Filed: Nov. 21, 2019

(65) Prior Publication Data
US 2020/0164487 A1    May 28, 2020

(30) Foreign Application Priority Data

Nov. 27, 2018  (GB) ..................................... 1819238

(51) Int. Cl.
*B24C 5/00* (2006.01)
*B24C 1/08* (2006.01)
*F02C 7/36* (2006.01)

(52) U.S. Cl.
CPC .............. *B24C 5/005* (2013.01); *B24C 1/083* (2013.01); *F02C 7/36* (2013.01); *F05D 2220/32* (2013.01);
(Continued)

(58) Field of Classification Search
CPC . B24C 5/005; B24C 1/083; F02C 7/36; F05D 2220/32; F05D 2230/10;
(Continued)

(56) References Cited

U.S. PATENT DOCUMENTS 5,707,453 A    1/1998  Shurman
6,493,289 B2   12/2002 Kitaori et al.
(Continued)

FOREIGN PATENT DOCUMENTS

CN    203611072 U       5/2014
CN    104191320 A   *  12/2014
(Continued)

OTHER PUBLICATIONS

Apr. 30, 2020 extended Search Report issued in European Patent Application No. 19205673.7.
(Continued)

*Primary Examiner* — Jacob M Amick
*Assistant Examiner* — Charles J Brauch
(74) *Attorney, Agent, or Firm* — Oliff PLC

(57) ABSTRACT

A method and apparatus for finishing a surface of a metal component made by additive manufacturing are provided. The method comprises: containing the component 41 in a fluid 43 that comprises abrasive particles 48; and generating pressure fluctuations that produce acoustic cavitation in the fluid by applying ultrasonic vibration into the fluid by an ultrasonic horn 45, thereby removing material from the surface of the component by a combination of cavitation bubble collapse on the surface and the striking of the surface by abrasive particles 48 accelerated by cavitation bubble collapse.

19 Claims, 6 Drawing Sheets

(52) U.S. Cl.
CPC ...... *F05D 2230/10* (2013.01); *F05D 2240/60* (2013.01)

(58) Field of Classification Search
CPC ...... F05D 2240/60; B22F 10/20; B22F 10/10; B22F 2999/00; B22F 2998/10; B22F 5/009; B22F 5/04; B22F 3/24; B22F 2003/247; Y02P 10/25; B24B 31/10; B08B 7/028; B08B 3/12; B33Y 40/20; B33Y 40/00
See application file for complete search history.

(56) References Cited

U.S. PATENT DOCUMENTS

| | | |
|---|---|---|
| 2001/0037537 A1 | 11/2001 | Kitaori et al. |
| 2003/0150476 A1 | 8/2003 | Suzuki |
| 2005/0027137 A1 | 2/2005 | Hooker |
| 2008/0295860 A1 | 12/2008 | Burger |
| 2018/0274443 A1* | 9/2018 | Pointon .................... F02K 3/06 |

FOREIGN PATENT DOCUMENTS

| | | | |
|---|---|---|---|
| CN | 104191320 A | 12/2014 | |
| CN | 105773318 A | 7/2016 | |
| CN | 109454237 A | 3/2019 | |
| EP | 1149637 A2 | 10/2001 | |
| JP | S565998 A | 1/1981 | |
| JP | 2002059320 A | 2/2002 | |
| JP | 2010260016 A | 11/2010 | |
| WO | 2015/091615 A1 | 6/2015 | |
| WO | WO-2015091615 A1 * | 6/2015 | ........... B24B 31/064 |

OTHER PUBLICATIONS

Search Report of the Intellectual Property Office of the United Kingdom for GB1819238.5 dated Jun. 6, 2019.
Further Search Report of the Intellectual Property Office of the United Kingdom for GB1819238.5 dated Sep. 6, 2019.

* cited by examiner

FINISHING A SURFACE OF A COMPONENT MADE BY ADDITIVE MANUFACTURING

CROSS-REFERENCE TO RELATED APPLICATIONS

This specification is based upon and claims the benefit of priority from UK Patent Application Number 1819238.5 filed on 27 Nov. 2018, the entire contents of which are incorporated herein by reference.

BACKGROUND

1. Field of the Disclosure

The disclosure relates to an apparatus for finishing a surface of a metal component made by additive manufacturing, a method for finishing a surface of such a metal component, a component having a surface finished using the method and a gas turbine engine comprising such a component.

2. Description of the Related Art

Components of an aircraft engine such as a gas turbine engine can be made by additive manufacturing. After manufacturing, the surfaces of such components need to be finished (e.g. smoothed and/or cleaned). Some components have internal channels which make it more difficult to finish the surfaces of the internal channels. The finishing involves removing material so as to reduce the surface roughness.

CN203611072 U discloses a device for polishing holes by driving abrasive particles. Electrophoresis assistance and ultrasonic machining are employed together. Abrasive particles are adsorbed close to a tool under the adsorption action of electrophoresis. The aim is to polish workpieces by the movement of the abrasive particles in the solution relative to the surface.

CN105773318A discloses an immersion ultrasonic surface treatment method for polymer 3D printing products.

However, the industrial standards and requirements for the surfaces of products have been greatly increased. The conventional finishing techniques mentioned above fail to achieve a sufficiently high quality surface finish throughout the component.

It is an aim of the present disclosure to provide an apparatus and method for improved finishing of a surface of a metal component made by additive manufacturing.

SUMMARY

According to a first aspect of the disclosure there is provided a method of finishing a surface of a metal component made by additive manufacturing, the method comprising: containing the component in a fluid that comprises abrasive particles; and generating pressure fluctuations that produce acoustic cavitation in the fluid by applying ultrasonic vibration into the fluid by an ultrasonic horn, thereby removing material from the surface of the component by a combination of cavitation bubble collapse on the surface and the striking of the surface by abrasive particles accelerated by cavitation bubble collapse.

The abrasive particles may be accelerated by both ultrasonic acoustic waves in the fluid generated by the ultrasonic vibration of the horn and by secondary shock waves generated by the cavitation bubble collapse.

The output power density of the horn may be at least $10^5$ W/m$^2$.

The method may further comprise recirculating the fluid in the container in order to maintain the homogeneity of the fluid.

The method may further comprise mounting the component directly onto the ultrasonic horn so that the ultrasonic horn induces vibration of the component at an ultrasonic frequency at which the horn vibrates.

The abrasive particles may have a mean size of less than 100 µm. They may have sharp edges and thereby act as cavitation nucleation sites upon ultrasonic excitation. The abrasive particles may have corners with a mean corner radius of less than 20% of the mean maximum length of the abrasive particles. The corners may have a mean radius that is less than 10% of the mean maximum length of the abrasive particles.

The surface of the component from which the material is removed may be an internal channel of the component.

The method may further comprise fitting the finished component in a gas turbine engine. The method may further comprise fitting a gas turbine engine comprising the finished component to an aircraft.

According to a second aspect of the disclosure there is provided an apparatus for finishing a surface of a metal component made by additive manufacturing, the apparatus comprising: a container for containing the component in a fluid comprising abrasive particles; an ultrasonic transducer configured to vibrate; and an ultrasonic horn configured to transfer vibration from the transducer into the fluid in the container to generate pressure fluctuations that produce acoustic cavitation in the fluid, and thereby remove material from the surface of the component by a combination of cavitation bubble collapse on the surface and the striking of the surface by abrasive particles accelerated by cavitation bubble collapse.

The abrasive particles may be accelerated by both ultrasonic acoustic waves in the fluid generated by the ultrasonic vibration of the horn and by secondary shock waves generated by the cavitation bubble collapse.

The apparatus may be configured such that in use the output power density of the horn is at least $10^5$ W/m$^2$.

The apparatus may further comprise the fluid. The abrasive particles may have a mean size of less than 100 µm. The abrasive particles may have sharp edges and thereby act as cavitation nucleation sites upon ultrasonic excitation. The abrasive particles may have corners with a mean corner radius of less than 20% of the mean maximum length of the abrasive particles. The corners may have a mean radius that is less than 10% of the mean maximum length of the abrasive particles.

The apparatus may further comprise a circuit for recirculating the fluid in the container in order to maintain the homogeneity of the fluid.

According to another aspect of the disclosure there is provided an apparatus for finishing a surface of a metal component made by additive manufacturing, the apparatus comprising: a container for containing the component in a fluid; an ultrasonic transducer configured to vibrate; and an ultrasonic horn configured to transfer vibration from the transducer into the fluid in the container; wherein the apparatus is configured such that in use the output power density of the horn is at least $10^5$ W/m$^2$.

In an arrangement, the horn is positioned relative to the container such that in use its tip extends into and is submerged in the fluid. In an arrangement, the horn is configured to allow the component to be mounted directly onto it.

In an arrangement, the apparatus comprises: a circuit for recirculating the fluid in the container.

In an arrangement, the apparatus comprises: a slurry as the fluid in the container, wherein the slurry comprises abrasive particles. In an alternative arrangement, the apparatus comprises: a homogeneous liquid as the fluid in the container.

In an arrangement, the apparatus comprises: the metal component. In an arrangement, the component comprises at least one internal channel.

According to another aspect of the disclosure there is provided a method for finishing a surface of a metal component made by additive manufacturing, the method comprising: containing the component in a fluid; and applying vibration into the fluid by an ultrasonic horn; wherein the output power density of the horn as at least $10^5$ W/m$^2$.

According to another aspect of the disclosure there is provided a component having a surface finished using the methods of the disclosure.

According to another aspect of the disclosure there is provided a gas turbine engine for an aircraft comprising the component having a surface finished using the methods of the disclosure.

In an arrangement, the gas turbine engine comprises: an engine core comprising a turbine, a compressor, and a core shaft connecting the turbine to the compressor; a fan; and a gearbox that receives an input from the core shaft and outputs drive to the fan so as to drive the fan at a lower rotational speed than the core shaft; wherein the fan is located upstream of the engine core.

In an arrangement, the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

BRIEF DESCRIPTION OF THE DRAWINGS

Embodiments will now be described by way of example only, with reference to the Figures, in which.

DETAILED DESCRIPTION OF THE DISCLOSURE

Figure 1:
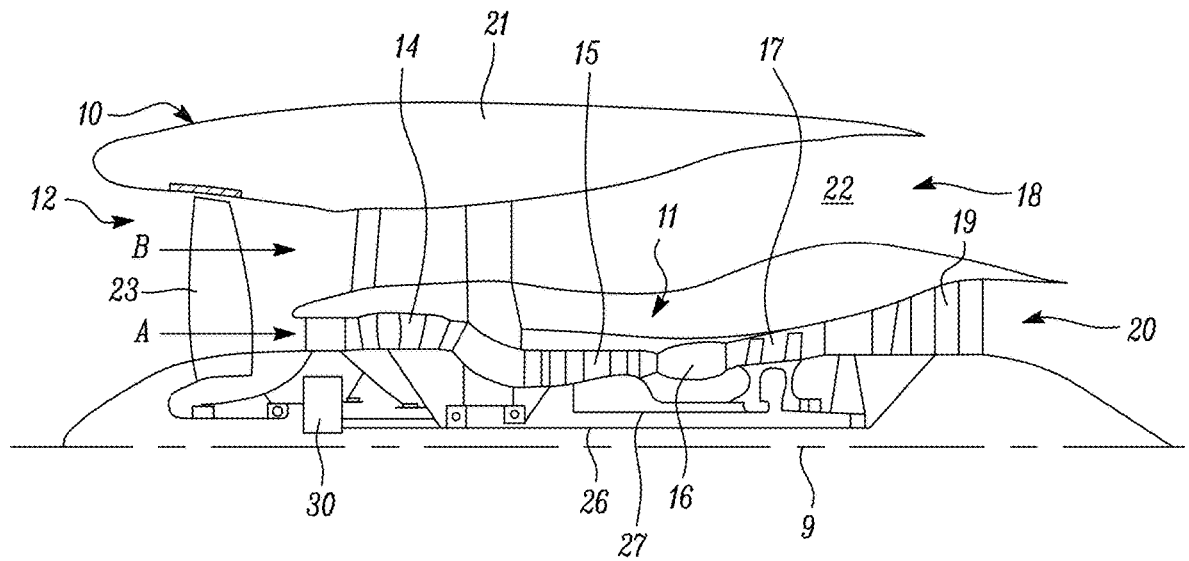
FIG. 1 is a sectional side view of a gas turbine engine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
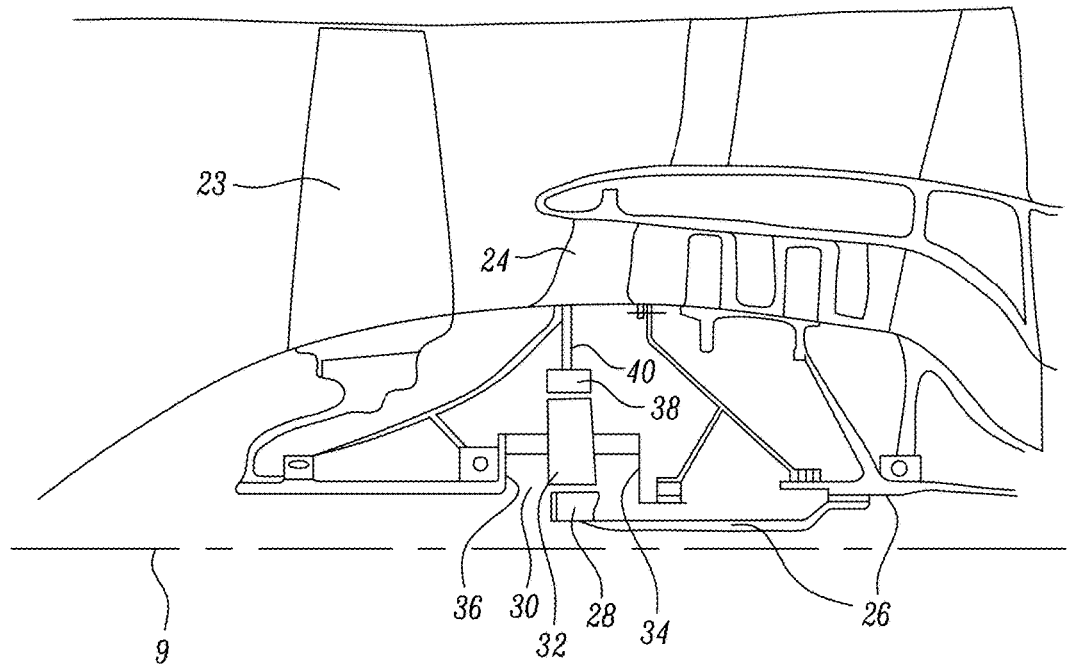
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
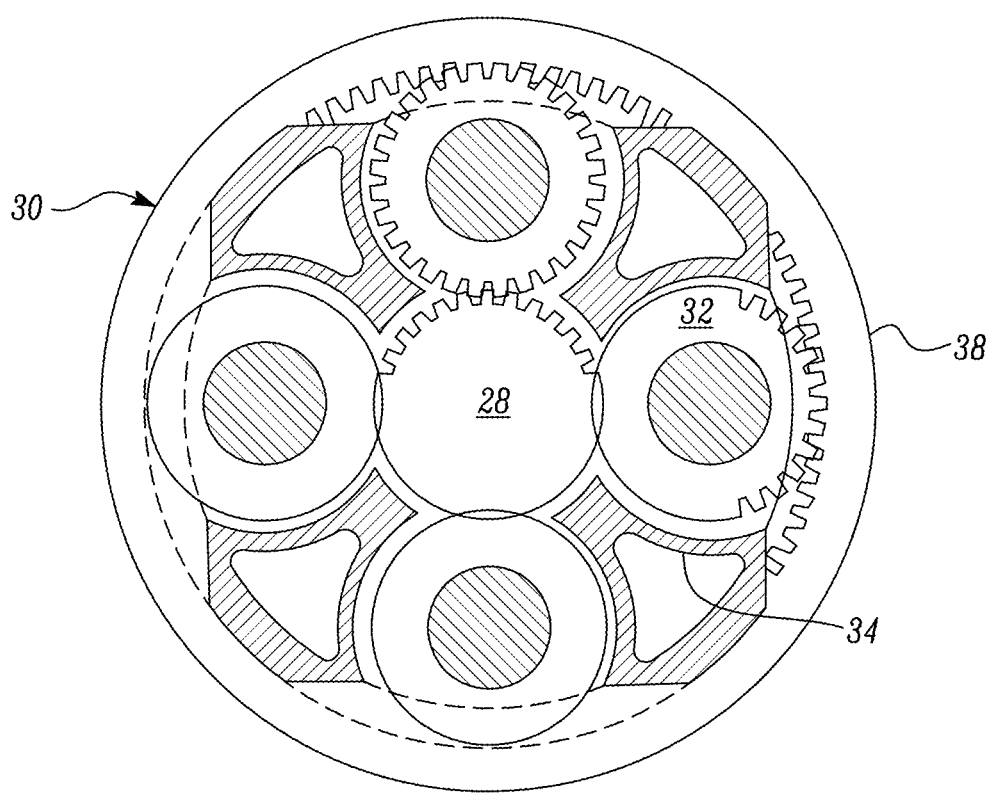
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
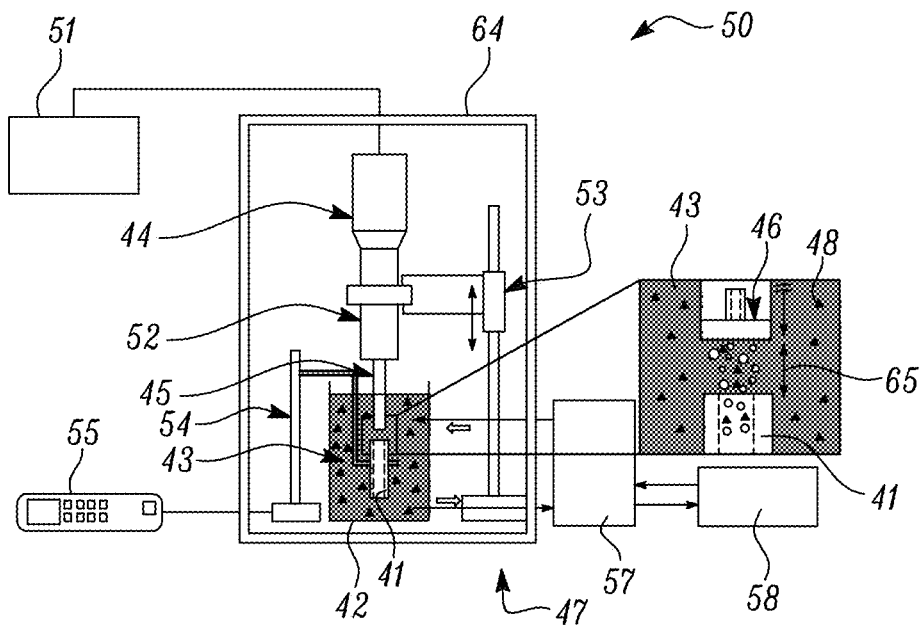
FIG. 4 shows an arrangement of an apparatus according to the disclosure.

FIG. 4 depicts an arrangement of an apparatus 50 according to the disclosure. The apparatus 50 is for finishing a surface of a metal component 41. The finishing may comprise cleaning and/or smoothing of the surface. The apparatus 50 may also be used for finishing a surface of components made of other materials such as polymers. The component 41 may have been made by additive manufacturing, such as additive layer manufacturing. The component 41 may alternatively be formed from other 3D printing techniques or by techniques other than 3D printing.

As shown in FIG. 4, in an arrangement the apparatus 50 comprises a container 42. The container 42 is for containing the metal component 41 in a fluid 43. The type of the container 43 is not particularly limited. As shown in FIG. 4, in an arrangement the container 43 has an open top. Alternatively, the top of the container 43 could be closed around the horn 45 that dips into the fluid 43. The horn may be dipped into the fluid so that the tip is at a depth that is between about 1 and 3 times the diameter of the horn, more preferably between about 1.5 and 2.5 times the diameter of the horn.

In an arrangement, the fluid 43 is a slurry comprising abrasive particles 48. However, the apparatus 50 and method of the disclosure can work with or without abrasive particles 48. In particular, in an arrangement the fluid 43 is a homogenous liquid (i.e. without abrasive particles). Without abrasive particles, the mechanism of material removal is mainly governed by erosion due to cavitation bubble collapse (explained in more detail below) at very high intensity and heterogeneous cavitation due to surface irregularities of the component 41.

As shown in FIG. 4, in an arrangement the apparatus 50 comprises an ultrasonic transducer 44. The ultrasonic transducer 44 is configured to vibrate. The transducer 44 converts electrical signals to ultrasound. As shown in FIG. 4, in an arrangement the apparatus 50 comprises an ultrasonic generator 51. The ultrasonic generator 51 is configured to provide electrical signals to the transducer 44. The ultrasonic generator 51 is configured to control the frequency and/or amplitude of the vibration of the transducer 44. The ultrasonic generator 51 can vary the frequency and/or amplitude of the vibration of the transducer 44. In an arrangement, a sonotrode and waveguides are attached for particular frequencies.

As shown in FIG. 4, in an arrangement the apparatus 50 comprises an ultrasonic horn 45. The ultrasonic horn 45 is configured to transfer vibration from the transducer 44 into the fluid 43 in the container 42. In an arrangement the ultrasonic horn 45 is configured to augment the oscillation displacement amplitude provided by the transducer 44. As shown in FIG. 4, in an arrangement the apparatus 50 comprises a booster 52. The booster 52 is configured to increase the amplitude of vibration. In an arrangement, the booster 52 forms part of the ultrasonic horn 45. Alternatively, the booster 52 may be a separate component from the horn 45. In an arrangement, the horn 45 is made of metal. For example, the horn 45 may comprise a metal bar. In an arrangement, the horn tapers.

In use, the fluid 43 is forced to oscillate at an ultrasonic frequency induced by the horn 45. This generates acoustic cavitation. When the static pressure at any location in the fluid 43 falls below its vapour pressure at operating temperature, vapour bubbles are formed. These bubbles filled with vapour expand and may aggregate with adjacent bubbles to form larger bubbles or a cluster of cavitation bubbles in the fluid 43. The resulting vapour bubbles are transported by acoustic waves and subsequently collapse when the pressure in the direction of flow recovers above the vapour pressure. Pressure amplitude fluctuations decrease away from the horn 45 such that fewer bubbles are generated away from the horn 45. When the bubbles collapse, they generate highly localised temperature and pressure shockwaves. The shockwaves can remove material from the surface of the component 41.

As mentioned above, in an arrangement the fluid 43 comprises abrasive particles 48. The abrasive particles 48 can enhance the material removal process. When the cavitation bubbles collapse, a highly localised pressure shockwave is generated. The abrasive particles 48 are accelerated by these acoustic waves as well as secondary shockwaves. The abrasive particles 48 strike the surface of the component 41 and remove material. The surface finishing is achieved using cavitation bubble collapse on the surface, or by accelerated abrasive particles 48 in the direction of the flow, or by a combined effect of both mechanisms.

The abrasive particles 48 preferably have sharp edges, though round (substantially spherical, for example) particles may also be used. The use of sharp-edged particles increases the likelihood of the particles acting as nucleation sites upon ultrasonic excitation, which may increase the generation of cavitation bubbles. The term "sharp" may be understood to mean that the particles have corners, for example corners with a corner radius that is less than about 20% or preferably less than about 10% of the maximum length of the particle in any direction. Examples of suitable abrasive particles include Silicon Carbide (SiC), Alumina or Aluminium Powder ($Al_2O_3$), Boron Carbide ($B_4C$) or diamond abrasives, and Inconel 625.

The abrasive particles 48 preferably have a mean size of less than about 250 µm, for example less than about 150 µm, more preferably less than about 125 µm, perhaps most preferably less than about 100 µm. For example, the abrasive particles may have a mean size of between about 10 µm and 250 µm, between about 10 µm and 150 µm, between about 10 µm and 100 µm, and in one particularly preferred example are between about 10 µm and 50 µm. Depending on the required finish, other mean particle sizes may be used, for example between about 20 µm and 100 µm, or between about 30 µm and 100 µm. The small size of the abrasive particles increases likelihood of the abrasive particles acting as nucleation sites upon ultrasonic excitation, which may increase the generation of cavitation bubbles.

As mentioned above, in an arrangement the ultrasonic generator 51 may be multi-frequency and multi-amplitude. The ultrasonic generator 51 can produce a variable frequency. This may be achieved using piezoelectric crystals in the transducer 44. The vibrations are amplified (e.g. by the booster 52) and transmitted to the horn 45. As shown in the expanded view in the right-hand side of FIG. 4, in an arrangement the horn 45 comprises a tip 46. The tip 46 may be formed integrally with the horn 45. Alternatively, the tip 46 may be replaceable (i.e. configured to be detachable from the rest of the horn 45). The tip 46 may be referred to as a radiating tip.

As shown in FIG. 4, in an arrangement the apparatus 50 comprises a stand 53. The stand 53 is configured to hold the transducer horn assembly. The transducer horn assembly comprises the transducer 44, the booster 52 and the horn 45. As shown by the double ended arrow next to the stand 53 in FIG. 4, in an arrangement the stand 53 is configured to hold the transducer horn assembly at a variable height. The holder of the stand 53 is moveable in this direction. In an arrangement, the holder is configured to rotate around two perpendicular axes, for example by a motorised mechanism.

As shown in FIG. 4, in an arrangement the apparatus 50 comprises a fixture 54. The fixture 54 is configured to hold the component 41. The fixture 54 can be controlled so as to control alignment of the component 41. For example, the fixture 54 can be controlled so as to align an internal channel 49 of the component 41 with the horn 45. In particular, the longitudinal direction of the horn 45 may match the longitudinal direction of the internal channel 49 of the component 41. In an arrangement, the fixture 54 is configured to control the orientation of the component 41 around three axes (which may be orthogonal). In an arrangement, the fixture 54 is configured to control the movement of the component 41 in six degrees of freedom (position and rotational position).

Figure 9:
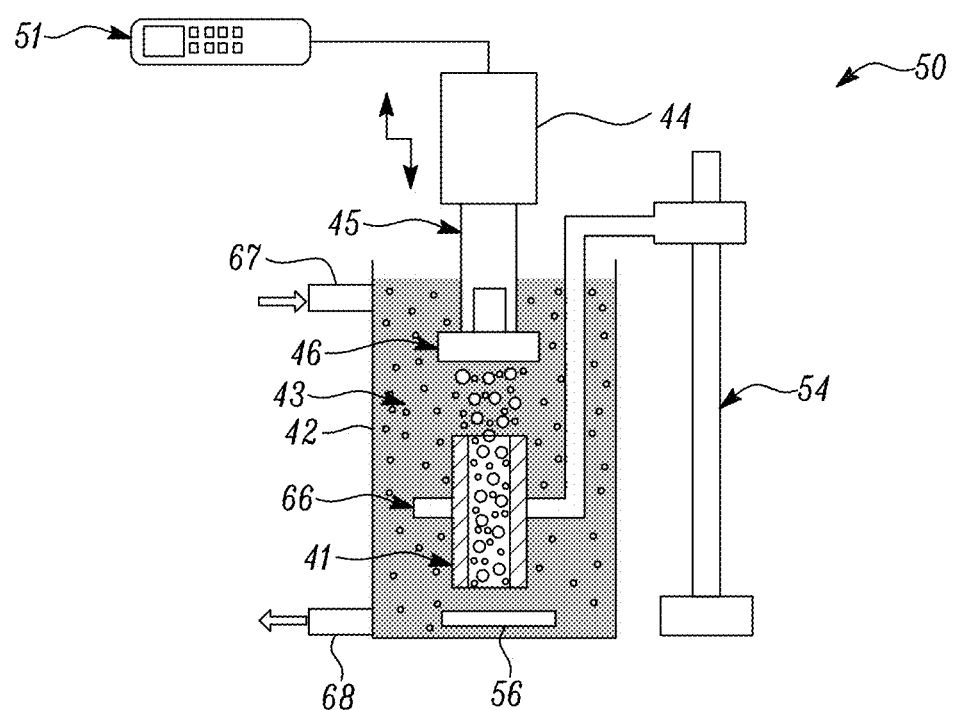
FIGS. 9 and 10 show alternative arrangements of an apparatus according to the disclosure.

As shown in FIG. 9, in an arrangement the fixture 54 comprises a support 66. The support 66 is configured to support the component 41 in whatever orientation is determined by the fixture 54.

As shown in FIG. 4, in an embodiment the apparatus 50 comprises a stage controller 55. The stage controller 55 is configured to control the fixture 54. The component 41 is held by the fixture 54 and lowered into the container 42 (i.e. bath).

Figure 10:
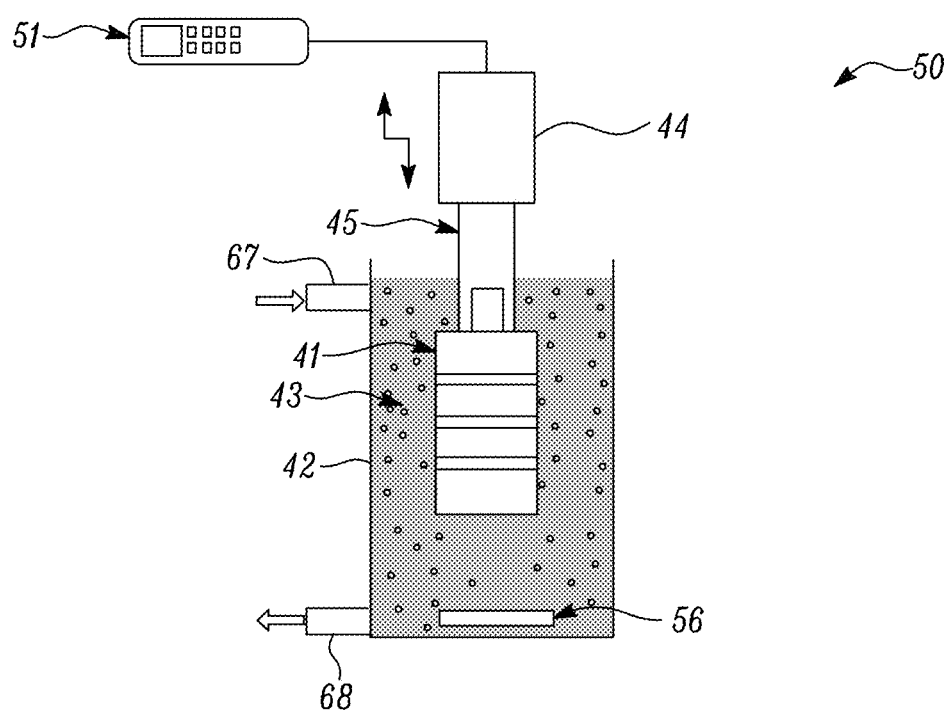

As shown in FIGS. 9 and 10, in an arrangement the apparatus 50 comprises a stirrer 56. The stirrer 56 is configured to mix the fluid 43. For example, the stirrer 56 may be used to mix the abrasive particles 48 with the water. In an arrangement, the stirrer 56 is a magnetic stirrer.

As shown in FIG. 4, in an arrangement the apparatus 50 comprises a circuit 47. The circuit 47 is for recirculating the fluid 43 in the container 42, which may help maintain the homogeneity of the fluid, and in particular may maintain a roughly uniform concentration of abrasive particles in the fluid. If the abrasive particles 48 are not circulated they may tend to settle at the bottom of the container 42, which reduces the efficiency of the finishing processing. The circuit 47 comprises a pump 57. The pump 57 may be a peristaltic pump. The pump 57 is configured to pump the fluid 43 in the container 42.

Where the apparatus 50 is used to finish an internal channel, the circuit may be configured to recirculate the fluid so that at least 50% of the abrasive particles 48 in the fluid 43 contained within the internal channel are new, fresh abrasive particles.

As shown in FIG. 4, in an arrangement the apparatus 50 comprises a temperature control 58. The temperature control 58 is configured to control the temperature of the fluid 43 in the container 42. This can help to maintain a constant temperature of the fluid 43 throughout the finishing process.

As shown in FIG. 4, in an arrangement the apparatus 50 comprises an enclosed chamber 64. The enclosed chamber 64 is configured to enclose the horn 45 and the container 42.

As shown in the enlarged view in the right-hand side of FIG. 4, there may be a standoff distance 65 between the tip 46 of the horn 45 and the component 41.

When abrasive particles 48 are used, it is desirable for some of the abrasive particles 48 to be between the tip 46 and the component 41. The fluid 43 may be continuously recirculated to maintain fresh abrasive particles 48 between the horn 45 and the component 41 to be finished.

As shown in FIG. 4, in an arrangement the horn 45 is positioned relative to the container 42 such that in use its tip 46 extends into and is submerged in the fluid 43. In an arrangement, the ultrasonic horn tip 46 is placed in close proximity to the surface of the component 41 that is to be cleaned. In an arrangement, the tip 46 is positioned close to the entry of the internal channel 49 of the component 41. In an arrangement, the horn 45 is at least partially inserted into the internal channel 49. The size of the horn 45 can be selected so as to achieve finishing of different parts of the component 41.

As shown in FIG. 10, in an alternative arrangement the horn 45 is configured to allow the component 41 to be mounted directly onto it. The component 41 is directly fixed on the horn 45 (or the booster 52) using fixtures and waveguides designed to suit a specific frequency and geometry. Mounting the component 41 directly onto the horn 45 may induce vibration of the component 41 at the frequency of vibration of the horn 41, which may in turn cause greater nucleation of cavitation bubbles from surface irregularities of the component 41. This may lead to preferential erosion of the surface irregularities.

For example, the component 41 can be directly screwed onto the horn 45 with a suitable sonotrode and waveguides. The size of the horn 45 is not particularly limited. Merely as an example, the size of the horn may vary from 1 mm to 25 mm. The size of the horn 45 can be selected based on the size of the component 41 and the type of finishing required.

When the component 41 is vibrated at an ultrasonic frequency, cavitation bubbles are generated uniformly throughout its surface. These bubbles collapse near the surface of the component 41, helping remove material from this surface. At a lower intensity of bubble collapse, the bubble collapse helps in cavitation peening.

The size of bubble growth and collapse intensity can be controlled by varying the frequency and amplitude of the vibration. The apparatus 50 can be used for surface finishing (e.g. cleaning, smoothing and/or surface stress modification) by cavitation peening depending on the operating conditions.

The mechanism of the disclosure will be described in further detail below, with particular reference to FIGS. 5 to 8. The mechanism is based on cavitation effects in a solid-liquid mixture. As explained above, it is not essential for the fluid 43 to comprise the abrasive particles 48. Surface finishing can be achieved by cavitation conditions without abrasive particles 48. Abrasive particles 48 can help to accelerate finishing (e.g. smoothing) of the surfaces of the component 41.

Figure 5:
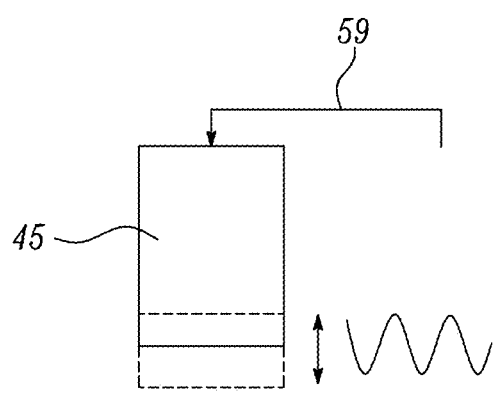
FIG. 5 shows an ultrasonic transducer.

As shown in FIG. 5, the ultrasonic horn 45 has a vibrating amplitude (shown by the double-ended arrow and oscillating line). In an arrangement, the vibrating frequency is controlled by a variable frequency drive signal 59. In an arrangement, the vibrating amplitude is controlled by power input to the ultrasonic generator 51.

Figure 6:
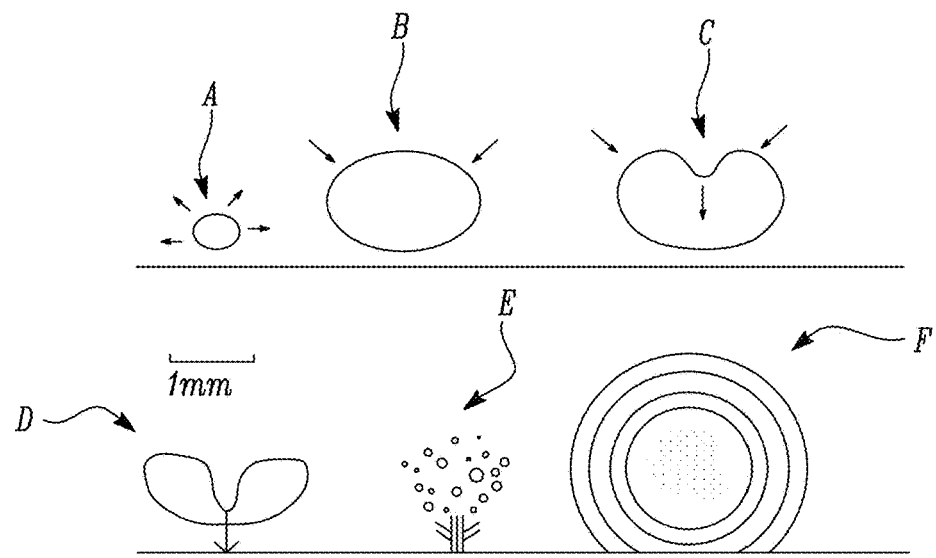
FIG. 6 shows stages of a mechanism for finishing a component.

FIG. 6 shows different stages of the bubble formation and collapse. As shown in stage A, the cavitation bubble grows due to local pressure decreases as a result to the ultrasound in the fluid 43. As shown in stage B, the bubbles are subjected to pressure from the fluid 43. Subsequently, in stages C and D the pressure from the fluid 43 leads to collapse of the bubble. As shown in stage E, the collapse generates a high speed micro-jet. As shown in stage F, collapse of the bubbles generates a secondary shockwave. When abrasive particles are used, the secondary shockwave accelerates the abrasive particles. The high speed micro-jet and the secondary shockwave help to clean the surface by removing rough sections.

In addition, heterogeneous cavitation bubbles are generated due to surface irregularities and/or acoustic waves carry the abrasive particles at very high velocity which strike and remove material.

Figure 7:
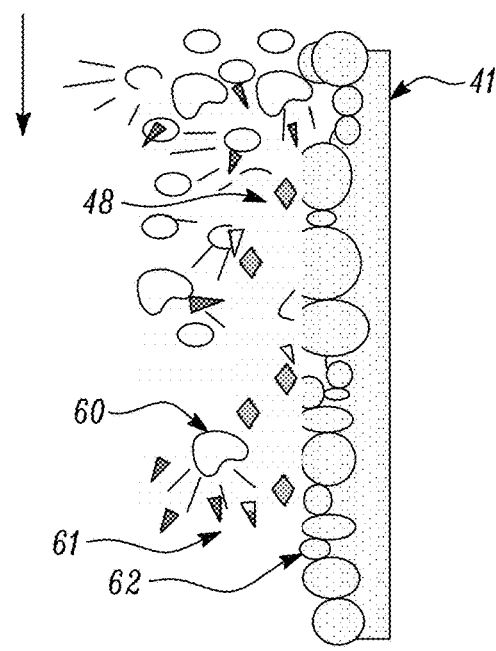
FIG. 7 schematically shows the finishing process at the surface of the component.

In FIG. 7, the downwards arrow indicates the direction of ultrasonic wave propagation. Some abrasive particles 48 are positioned near the surface of the component 41. Cavitation bubble collapse is indicated by reference numeral 60. A secondary shockwave is indicated by reference numeral 61. The powders 62 at the surface of the component 41 can be removed by these cavitation effects.

Figure 8:
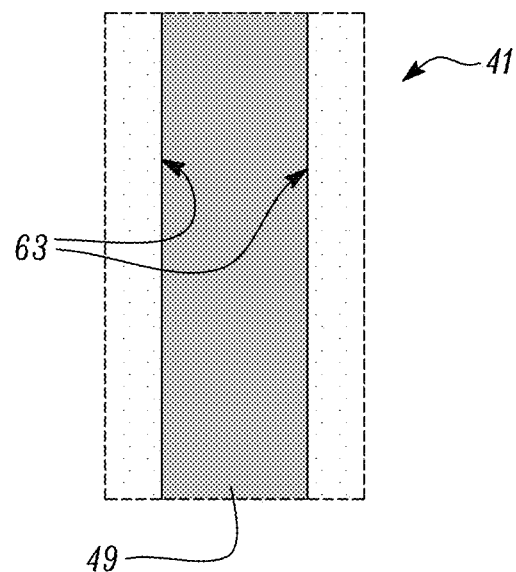
FIG. 8 shows part of the finished component.

FIG. 8 shows the finished surfaces 63 of the component 41.

In an arrangement, the apparatus 50 is configured such that in use the output power density of the horn 45 is at least $10^5$ W/m$^2$, measured over the area of the tip of the horn. In an arrangement, the output power density of the horn 45 is at least $1.5 \times 10^5$ W/m$^2$, optionally at least $2.0 \times 10^5$ W/m$^2$, and optionally at least $5.0 \times 10^5$ W/m$^2$. By providing such a high power density, the surfaces of the component 41 can be cleaned by cavitation effects alone, without requiring the abrasive particles 48. Cavitation bubble collapse is a high energy phenomenon. The micro-jets resulting from the collapse of individual cavitation bubbles can reach a velocity of about 200-500 m/s.

When abrasive particles 48 are used, there can be an efficient transfer of energy between the collapsing bubbles and the abrasive particles 48. This can improve speed of material removal from the surfaces of the component 41. This enables components 41 with a high initial surface roughness to be finished efficiently.

The disclosure can help to provide uniform finishing even on complex bends within a component 41. This is because the mechanism is not a flow-base process, in contrast to abrasive flow machining for example. Cavitation effects are distributed relatively evenly within a local area. As a result, the abrasive energy at the inner radius is similar to at the outer radius of a bend at the surface of the component 41.

Variation of the frequency of vibration allows control over the size, generation and collapse intensity of the cavitation bubbles. Hence, by changing the frequency of vibration, a surface can be finished by way of residual stress improvement by cavitation peening or, for surface smoothing, by the introduction of abrasive powders. An arrangement of the disclosure is expected to work well in restrictions, bends, branches and other complex geometries and features of the component 41.

The disclosure is particularly well suited for metal components 41, for example components used for an aerospace application. This is because such metal components 41 typically have complex features and complex geometrical requirements. The finishing process of the disclosure may modify the surface finish by removing partially melted powders, balling melts and other surface irregularities for achieving a smoother surface finish.

The disclosure can also be used to modify the mechanical properties of the surface of the component. For example, cavitation peening (i.e. the implosion of cavitation bubbles on the surface of the component 41) can be used to induce compressive stress at the surface of the component 41. This can be achieved without the use of any abrasive components 48.

The process can also be used for cleaning the surface of scales, dirt or foreign particles.

As shown in FIGS. 9 and 10, in an arrangement the circuit 47 comprises a fluid input port 67 and a fluid output port 68. The fluid input port 67 is for inputting fluid 43 into the container 42. The fluid 43 exits the container 42 through the fluid output port 68.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of finishing a surface of a metal component made by additive manufacturing, the method comprising:
   containing the component in a fluid that comprises abrasive particles;
   generating pressure fluctuations that produce acoustic cavitation in the fluid by applying ultrasonic vibration into the fluid by an ultrasonic horn, thereby removing material from the surface of the component by a combination of cavitation bubble collapse on the surface and the striking of the surface by abrasive particles accelerated by cavitation bubble collapse; and
   mounting the component directly onto the ultrasonic horn so that the ultrasonic horn induces vibration of the component at an ultrasonic frequency at which the horn vibrates.

2. The method of claim 1, wherein the output power density of the horn is at least $10^5$ W/m$^2$.

3. The method of claim 1, further comprising:
   recirculating the fluid in a container in order to maintain the homogeneity of the fluid.

4. The method of claim 1, wherein the abrasive particles have a mean size of less than 100 μm.

5. The method of claim 1, wherein the abrasive particles have sharp edges and thereby act as cavitation nucleation sites upon ultrasonic excitation.

6. The method of claim 5, wherein the abrasive particles have corners with a mean corner radius of less than 20% of the mean maximum length of the abrasive particles.

7. The method of claim 1, wherein the surface of the component from which the material is removed is an internal channel of the component.

8. The method of claim 1, further comprising:
   fitting the finished component in a gas turbine engine.

9. The method of claim 1, further comprising:
   fitting a gas turbine engine comprising the finished component to an aircraft.

10. A component having a surface finished using the method of claim 1.

11. A gas turbine engine for an aircraft comprising the component of claim 10.

12. The gas turbine engine of claim 11 comprising:
    an engine core comprising a turbine, a compressor, and a core shaft connecting the turbine to the compressor;
    a fan; and
    a gearbox that receives an input from the core shaft and outputs drive to the fan so as to drive the fan at a lower rotational speed than the core shaft;
    wherein the fan is located upstream of the engine core.

13. The gas turbine engine according to claim 12, wherein:
    the turbine is a first turbine, the compressor is a first compressor, and the core shaft is a first core shaft;
    the engine core further comprises a second turbine, a second compressor, and a second core shaft connecting the second turbine to the second compressor; and
    the second turbine, second compressor, and second core shaft are arranged to rotate at a higher rotational speed than the first core shaft.

14. An apparatus for finishing a surface of a metal component made by additive manufacturing, the apparatus comprising:
    a container for containing the component in a fluid comprising abrasive particles;
    an ultrasonic transducer configured to vibrate; and
    an ultrasonic horn configured to transfer vibration from the transducer into the fluid in the container to generate pressure fluctuations that produce acoustic cavitation in the fluid, and thereby remove material from the surface of the component by a combination of cavitation bubble collapse on the surface and the striking of the surface by abrasive particles accelerated by cavitation bubble collapse,
    wherein the component is mounted directly onto the ultrasonic horn so that the ultrasonic horn induces vibration of the component at an ultrasonic frequency at which the horn vibrates.

15. The apparatus of claim 14, wherein the apparatus is configured such that in use the output power density of the horn is at least $10^5$ W/m$^2$.

16. The apparatus of claim 14, further comprising the fluid comprising abrasive particles.

17. The apparatus of claim 16, wherein the abrasive particles have a mean size of less than 100 μm.

18. The apparatus of claim 16, wherein the abrasive particles have sharp edges and thereby act as cavitation nucleation sites upon ultrasonic excitation.

19. The apparatus of claim 14, further comprising a circuit for recirculating the fluid in the container in order to maintain the homogeneity of the fluid.

* * * * *